United States Patent
Marsh

[19]

[11] Patent Number: 5,933,241
[45] Date of Patent: Aug. 3, 1999

[54] LASER CALIBRATION OF IR SENSORS USING PULSED SIGNALS

[75] Inventor: Richard A. Marsh, Lyons, Colo.

[73] Assignee: Lockheed Martin Corporation, Bethesda, Md.

[21] Appl. No.: 08/909,304

[22] Filed: Aug. 11, 1997

[51] Int. Cl.[6] .............................. G01B 11/00; G01J 5/00
[52] U.S. Cl. ...................................... 356/388; 250/338.1
[58] Field of Search .................................. 356/5, 73, 243, 356/388; 342/61, 53; 250/338.1

[56] References Cited

U.S. PATENT DOCUMENTS

| | | | |
|---|---|---|---|
| H933 | 7/1991 | Buczek ......................................... | 356/5 |
| 3,544,216 | 12/1970 | Besson et al. .............................. | 356/5 |
| 3,549,256 | 12/1970 | Brienza et al. ............................. | 356/4 |
| 3,698,811 | 10/1972 | Well ............................................. | 356/5 |
| 3,738,749 | 6/1973 | Everest ....................................... | 356/5 |
| 3,900,261 | 8/1975 | Wingate ...................................... | 356/5 |
| 4,333,008 | 6/1982 | Misek ......................................... | 250/225 |
| 4,424,943 | 1/1984 | Zwirn et al. ........................... | 244/3.11 |
| 4,988,191 | 1/1991 | Adrian et al. ............................. | 356/28 |
| 5,155,542 | 10/1992 | Rampolla et al. ......................... | 356/5 |
| 5,682,225 | 10/1997 | DuBois et al. ............................. | 356/73 |

*Primary Examiner*—Robert H. Kim
*Assistant Examiner*—Michael P. Stafira
*Attorney, Agent, or Firm*—Lane, Aitken & McCann

[57] ABSTRACT

A calibration system in which calibration target illuminates the IR sensor with at least two distinct inputs spaced apart in time approximately equal to the time it takes the IR sensor to scan an image of the target across the IR sensor field of response.

18 Claims, 2 Drawing Sheets

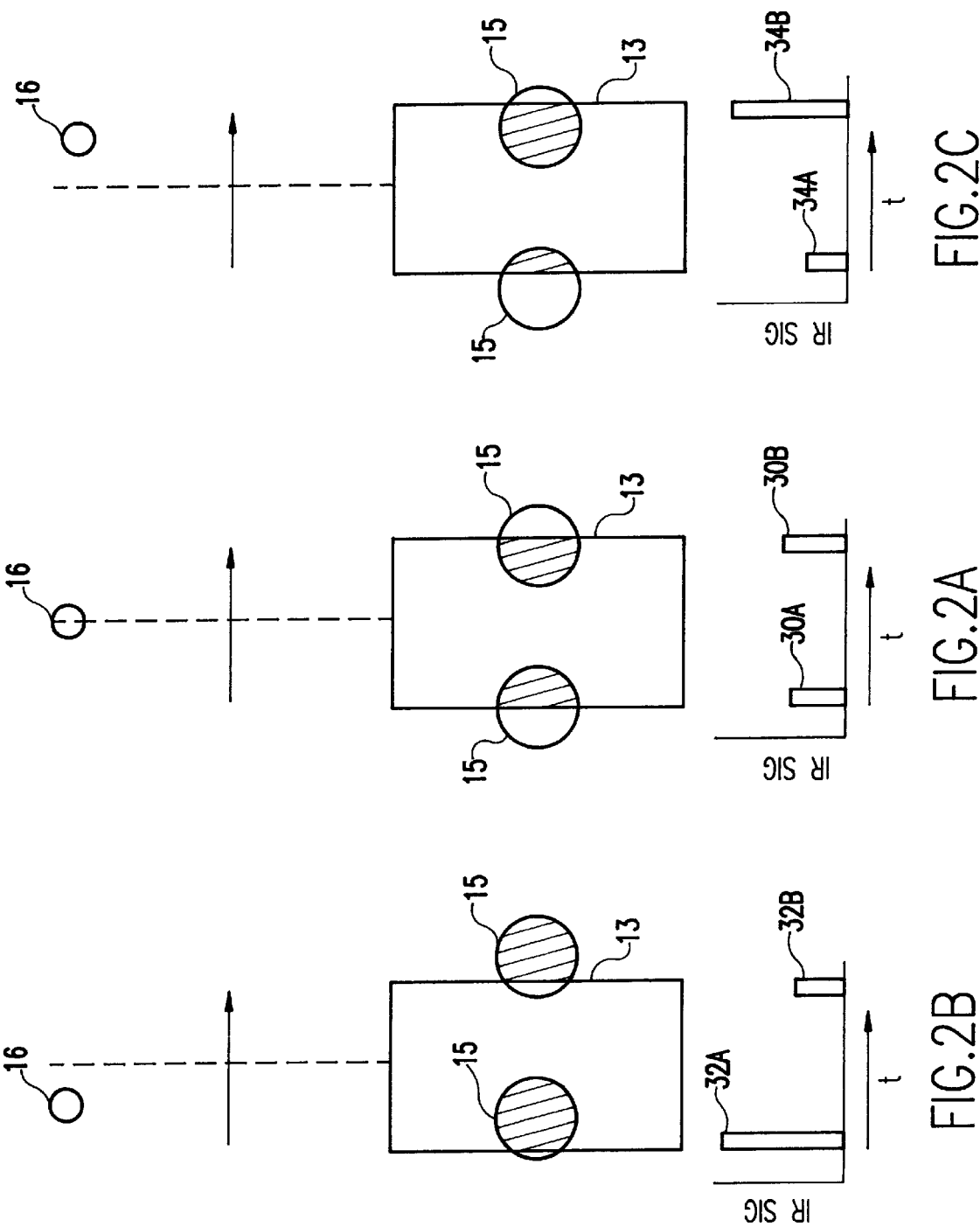

LASER CALIBRATION OF IR SENSORS USING PULSED SIGNALS

BACKGROUND OF THE INVENTION

1. Field of the Invention

This invention relates to an improved method for calibrating a line-of-sight infrared (IR) scanning system and, more particularly, to a calibration method that provides a correction factor for use in establishing the IR sensor line-of-sight at the time of peak sensor output in response to a target.

2. Description of the Prior Art

As will be appreciated by those skilled in the art, in certain line-of-sight IR systems, IR sensor data is time sampled with only a peak sensor output available for data processing. In such systems, if not accurately calibrated, the line-of-sight to target data may not be accurate due to a lack of precision in determining the scanning position. In the prior art, such systems have been calibrated by scanning the IR sensor past a point source calibration target (e.g. a continuous laser) located at a known position with respect to the IR sensor. As the image of the IR point source is scanned past the IR sensor, any deviation between the line-of-sight indicated by the scan data when the IR peak occurs and the known line-of-sight to the calibration target is used to generate a factor to calibrate the system. However, such prior art calibration systems cannot determine precisely where, as the calibration target scans across the IR sensor field of view, the IR sensor peak output occurs.

SUMMARY OF THE INVENTION

An object of this invention is the provision of a calibration method for IR systems which improves the line-of-sight accuracy of such systems.

Another object of the invention is the provision of such a calibration method wherein the calibration results can be easily implemented by the system software.

Briefly, this invention contemplates the provision of a calibration system in which the calibration target illuminates the IR sensor with at least two distinct inputs spaced apart in time approximately equal to the time it takes the IR sensor to scan an image of the target across the IR sensor field of response. In a preferred embodiment of the invention, the calibration target is a pulsed laser which illuminates the target with two equal, short duration pulses, timed so that the first and second pulses occur a short time before and after the assumed line-of-sight of the IR sensor scans across the calibration target. The relative magnitude or intensity of the IR sensor peak outputs in response to these two pulse inputs provides a vernier measurement of any deviation between the line-of-sight indicated by the scan position and the actual line-of-sight to the calibration target.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a pictorial representation illustrating the relative magnitude of the sensor outputs of the system of FIG. 1 for certain errors in scan position.

DESCRIPTION OF THE PREFERRED EMBODIMENTS

Figure 1:
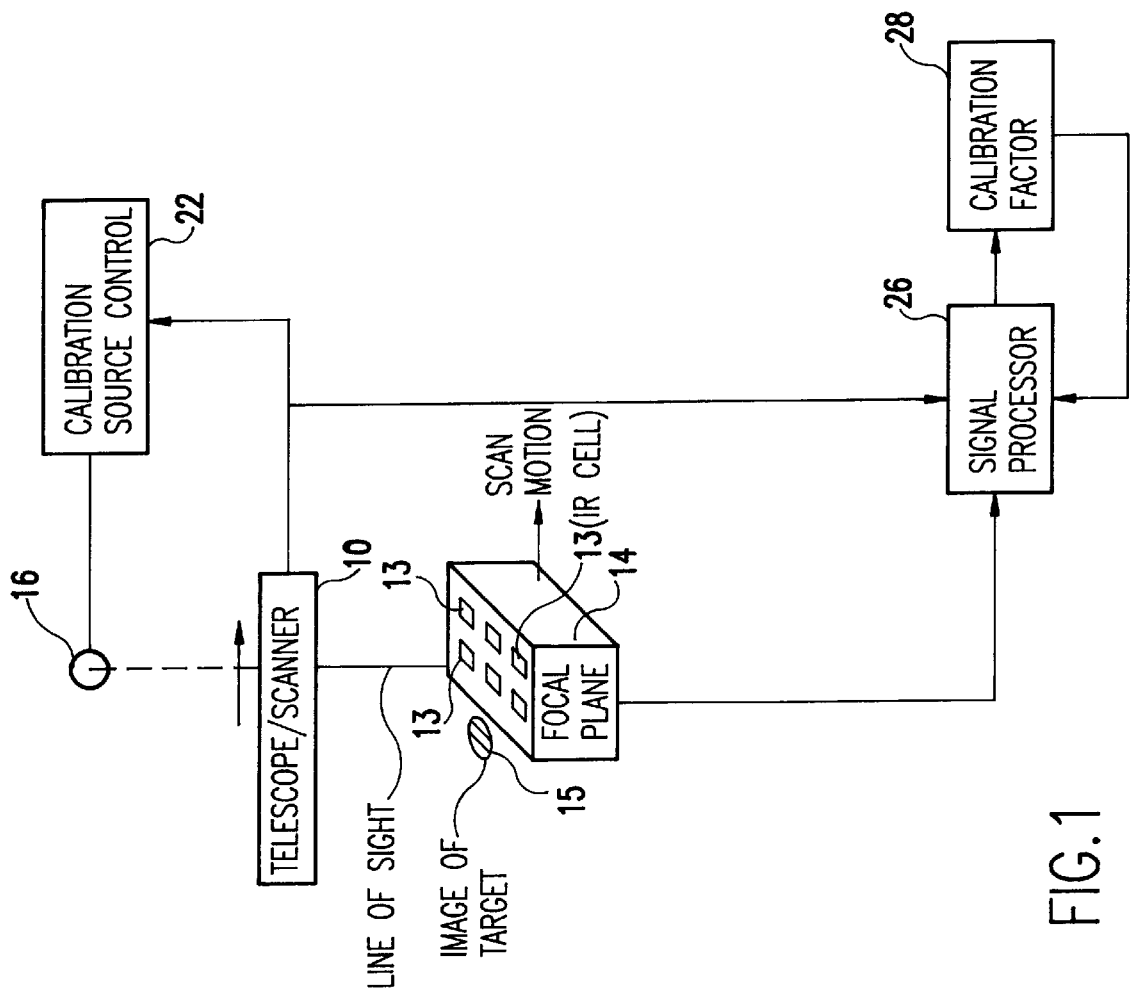
FIG. 1 is a block diagram of a calibration system in accordance with the teaching of this invention.

Referring now to FIG. 1, in a typical IR target positioning system, a telescope/scanner 10 is disposed to scan the image of a target onto an IR cell 13 on a focal plane 14. Although this illustrative embodiment of the invention contemplates scanning the image 15 of a target across the face of the cell, those skilled in the art will appreciate that the IR cell itself may be moved in order to scan across the target area. As will also be appreciated by those skilled in the art, the IR cell 13 does not receive a uniform level of incident radiation as the image crosses the cell 13 along the path indicated by the dotted lines. The regions adjacent each edge of the cell 13 (not shown) are regions of reduced incident energy caused by image blur circles not being fully contained on the cell. In order to calibrate the IR target position system that includes telescope/scanner 10, cell 13 and focal plane 14, a pulsed, radiation point source 16, such as a pulsed laser source, is placed at a known position relative to the cell 13. A controller 22 turns the point source 16 on and off to produce a short radiation pulse a short time before and a short time after the line-of-sight of the system passes the known position of the source 16, assuming an error free scanning system. Given a starting point in the scan, the controller 22 can estimate on the basis of elapsed time when the line-of-sight of the system passes the known position of the source 16.

The output of the cell 13 is coupled as an input to a digital signal processor 26, which also receives an input from the scanner indicating the position of the line-of-sight to the scanned image. A calibration process 28 calculates a factor for system calibration. As will be explained in more detail in connection with FIG. 2, this factor is a function of the relative magnitude of the output pulses from IR cell 13 generated in response to the two pulses from calibration source 16. This calibration factor can then be used to correct for errors, if any, due to a lack of precision in determining sensor line-of-sight position from the telescope/scanner 10.

Referring now to FIG. 2, it shows idealized pulse outputs from the calibration source 16 for three illustrative conditions. The condition of the center figure marked A is a no error condition. Here, the outputs 30A and 30B of the cell 13 in response to the first and second pulse output of the source 16 are equal in magnitude. It should be noted, the pulse widths of the output pulses of the source 16 are preferably narrow relative to the time it takes to scan the image of the calibration source 16 across the face of the IR cell 13. In these illustrative examples, the image is scanned from left to right (as indicated by the arrow in each figure).

The first pulse of the source 16 is timed to occur as the image of the source 16 passes over the left hand edge of the cell 13, if there is no error in the telescope/scanning system 10. In response to this first calibration source pulse, cell 13 generates an output pulse 30A. Similarly, the second pulse of the source 16 is timed to occur as the image of the source 16 passes over the right hand edge of the cell 13. In response to this second pulse, cell 14 generates cell output pulse 30B. In this assumed no error condition, the amplitude of pulses 30A and 30B are equal since they each fall on an equal area of the cell. In this example, each falls in the blur circle 15. The first and second pulses from source 16 are preferably spaced from one another at approximately equal to the time it takes to scan the image of the source 16 across the cell 13.

The left hand figure marked B illustrates the situation where there is a scanning error; the scanned image of the source 16 is to the right of the center of the cell when the controller 22 indicates that it should pass through the source 16. In this case, the first pulse from the source 16 is received by the cell 14 in a larger area of sensitivity, and the cell produces a relatively large output pulse 32A. The second pulse from source 16 falls on a region of the cell near (and perhaps beyond) the cells right hand edge, and the cell generates an output pulse 32B relatively small in magnitude. The relative magnitudes of these two pulses are used to generate a calibration factor so that software in the signal processor 26 can correct for the scanning error.

The right hand figure marked C illustrates another situation where there is a scanning error; the scanned image of the source 16 is to the left of the center of the cell when the controller 22 indicates that it should pass through the source 16. In this case the second pulse from the source 16 is received by the cell 13 in a larger area of sensitivity, and the cell produces a relatively large output pulse 34B. The first pulse from source 16 falls on a region of the cell near (and perhaps beyond) the cells left hand edge, and the cell generates an output pulse 34A relatively small in magnitude. The relative magnitudes of these two pulses are used to generate a calibration factor so that software in the signal processor 26 can correct for the scanning error.

Using a double pulse laser or shaped IR signal, the output of an amplified detector signal can be interpreted to greater precision than it can for a continuous input signal. Depending on the pulse separation and durations, the output signal can have two pulses, each with a magnitude. Using the magnitude or intensity of the two peaks, a precise time (and therefore position) for image crossing can be determined. This approach provides a vernier measurement of the position of the calibration image that is more precise than the time quantization of the output signal. The vernier measurement is determined using a sensor simulation model to characterize the sensor responses as a function of phase for a given pulse separation and duration. The characteristic response information is entered into a software program to automatically estimate the image position for each sensor double pulse.

The double pulse technique can be used to estimate multiple line-of-sight error sources. One application of this technique is to estimate telescope orientation or attitude (others include focal plane cell position error, boresight or alignment error, and telescope position or ephemeris error). The attitude of the telescope can be estimated using star sensor measurements or other reference measurements. Based on the double pulse measurements, it may appear that the attitude determination errors are providing a relatively large scan-to-scan variation. The double pulse technique does not remove these errors if they are interpreted as focal plane cell position errors and thus when the error sources are combined in an RSS fashion, the attitude errors remain large and dominate the error budget. A solution to this problem is to use the double pulse method to measure both the cell position error and the attitude errors in real time. To accomplish this, the double pulses are executed just ahead of the time (or in the scan direction just in advance of the position) of targets of interest. The double pulses at that time and location provide a position for the focal plane just a short portion of a scan in advance of the target measurement. Using this method, the currently dominating attitude errors would be reduced.

These and other modifications may be made to the specific embodiment of the invention without departing from the spirit and scope of the invention.

I claim:

1. A method for generating data to correct for scanning errors in a system using an infrared sensor cell to determine a line-of-sight to a target, including the steps of:

generating at least two radiation pulses separated in time from a source whose line-of-sight position with respect to said infrared sensor cell is known;

scanning an image of said source across said sensor cell so that said sensor cell generates two output pulses in response to said two radiation pulses;

determining the relative magnitudes of said two output pulses; and generating said data to correct scanning errors as a function of the relative magnitude of said two output pulses.

2. A method for generating data to correct for scanning errors in a system using a sensor cell to determine a line-of-sight to a target, including the steps of:

generating at least two radiation pulses separated in time from a source whose line-of-sight position with respect to said sensor cell is known;

scanning an image of said source across said sensor cell so that said sensor cell generates two output pulses in response to said two radiation pulses;

determining the relative magnitudes of said two output pulses; and generating said data to correct scanning errors as a function of the relative magnitude of said two output pulses.

3. A method for generating data to correct for scanning errors as in claim 1 wherein said two radiation pulses are separated in time by an interval approximately equal to the interval required to scan the image of said source across said infared sensor cell.

4. A method for generating data to correct for scanning errors as in claim 2 wherein said two radiation pulses are separated in time by an interval approximately equal to the interval required to scan the image of said source across said sensor cell.

5. A method for generating data to correct for scanning errors as in claim 3 wherein one of said two radiation pulses is generated prior to when the image of said source passes said line of sight and the other of said two radiation pulses is generated after said images of said source passes said line of sight.

6. A method for generating data to correct for scanning errors as in claim 4 wherein one of said two radiation pulses is generated prior to when the image of said source passes said line of sight and the other of said two radiation pulses is generated after said images of said source passes said line of sight.

7. A system that generates data that corrects for scanning errors, the system including an infrared sensor cell that determines a line-of-sight to a target, comprising:

a pulse generator that generates at least two radiation pulses separated in time from a source whose line-of-sight position with respect to said infrared sensor cell is known;

a scanner that scans an image of said source across said sensor cell so that said sensor cell generates two output pulses in response to said two radiation pulses;

a comparator that determines the relative magnitudes of said two output pulses; and a corrector that generates said data that corrects scanning errors as a function of the relative magnitude of said two output pulses.

8. A system that generates data that corrects for scanning errors, the system including a sensor cell that determines a line-of-sight to a target, comprising:

a generator that generates at least two radiation pulses separated in time from a source whose line-of-sight position with respect to said sensor cell is known;

a scanner that scans an image of said source across said sensor cell so that said sensor cell generates two output pulses in response to said two radiation pulses;

a comparator that determines the relative magnitudes of said two output pulses; and a corrector that generates said data that corrects scanning errors as a function of the relative magnitude of said two output pulses.

9. The system according to claim 7, wherein said two radiation pulses are separated in time by an interval approximately equal to the interval required to scan the image of said source across said infared sensor cell.

10. The system according to claim 8, wherein said two radiation pulses are separated in time by an interval approximately equal to the interval required to scan the image of said source across said sensor cell.

11. The system according to claim 9, wherein one of said two radiation pulses is generated prior to when the image of said source passes said line of sight and the other of said two radiation pulses is generated after said images of said source passes said line of sight.

12. The system according to claim 10, wherein one of said two radiation pulses is generated prior to when the image of said source passes said line of sight and the other of said two radiation pulses is generated after said images of said source passes said line of sight.

13. A system for generating data to correct for scanning errors using means for infrared sensing and for determining a line-of-sight to a target, comprising:

means for generating at least two radiation pulses separated in time from a source whose line-of-sight position with respect to said means for infrared sensing is known;

means for scanning an image of said source across said means for infrared sensing so that said means for infrared sensing generates two output pulses in response to said two radiation pulses;

means for determining the relative magnitudes of said two output pulses; and means for generating said data to correct scanning errors as a function of the relative magnitude of said two output pulses.

14. A method for generating data to correct for scanning errors using means for sensing and for determining a line-of-sight to a target, comprising:

means for generating at least two radiation pulses separated in time from a source whose line-of-sight position with respect to said means for sensing is known;

means for scanning an image of said source across said means for sensing so that said means for sensing generates two output pulses in response to said two radiation pulses;

means for determining the relative magnitudes of said two output pulses; and means for generating said data to correct scanning errors as a function of the relative magnitude of said two output pulses.

15. The system according to claim 13, wherein said two radiation pulses are separated in time by an interval approximately equal to the interval required to scan the image of said source across said means for infared sensing.

16. The system according to claim 14, wherein said two radiation pulses are separated in time by an interval approximately equal to the interval required to scan the image of said source across said means for sensing.

17. The system according to claim 15, wherein one of said two radiation pulses is generated prior to when the image of said source passes said line of sight and the other of said two radiation pulses is generated after said images of said source passes said line of sight.

18. The system according to claim 16, wherein one of said two radiation pulses is generated prior to when the image of said source passes said line of sight and the other of said two radiation pulses is generated after said images of said source passes said line of sight.

* * * * *